United States Patent [19]

Thaniyavarn

[11] Patent Number: 4,940,305
[45] Date of Patent: Jul. 10, 1990

[54] OPTICAL SWITCH BASED ON 1×2 DIRECTIONAL COUPLER

[75] Inventor: Suwat Thaniyavarn, Bellevue, Wash.

[73] Assignee: The Boeing Company, Seattle, Wash.

[21] Appl. No.: 227,826

[22] Filed: Mar. 22, 1989

[51] Int. Cl.$^5$ .............................................. G02B 6/10
[52] U.S. Cl. ............................. 350/96.14; 350/96.13
[58] Field of Search ................ 350/96.13, 96.14, 96.15

[56] References Cited

U.S. PATENT DOCUMENTS

| | | | |
|---|---|---|---|
| 4,145,109 | 3/1979 | Nelson | 350/96.14 |
| 4,175,827 | 11/1979 | McMahon | 350/96.14 |
| 4,492,425 | 1/1985 | Kersten et al. | 350/96.14 |
| 4,679,893 | 7/1987 | Ramer | 350/96.13 X |
| 4,820,009 | 8/1987 | Thaniyavarn | 350/96.13 |

FOREIGN PATENT DOCUMENTS 58-93036  6/1983  Japan .................. 350/96.13

OTHER PUBLICATIONS

Kogelnik, H. and Schmidt, R., "Switched Directional Couplers with Alternating $\Delta\beta$", *IEEE Journal of Quantum Electronics*, vol. QE-12, No. 7, pp. 396 (Jul. 1976).
Thaniyavarn, S., "Cross-talk Characteristics of $\Delta\beta$ Phase Reversal Directional Coupler Switches", Reprint of Proceedings of SPIE-The International Society for Optical Engineering, vol. 578, (Sep. 1985).
Brochure, "OGW Traveling-Wave 2×2 Switch with and without Fiber Optic Pigtails", Crystal Technology, Inc., 2 pages (Apr. 1988).
Brochure, "OGW 2×2 Switch with and without Fiber Optic Pigtails", Crystal Technology, Inc., 2 pages (Mar. 1988).
Thaniyavarn, S., "Self-biased 1×2 Modified Directional Coupler Modulator", SPIE, vol. 789, *Optical Technology for Microwave Applications* III (1987).
Yariv, A., "Coupled-Mode Theory for Guided-Wave Optics", *IEEE Journal of Quantum Electronics*, vol. QE-9, No. 9, (Sep. 1973).
Thaniyavarn, S., "Modulation Diagrams of Coupled-waveguide Interferometers and Directional Couplers", 8 pages (Aug. 1987).
Schmidt, R. V. and Kogelnik, H., "Electro-optically Switched Coupler with Stepped $\Delta\beta$ Reversal using Ti-diffused LiNbO$_3$ Waveguides", *Applied Physics Letters*, vol. 28, No. 9, (May 1976).
Papuchon, M., "Imperial B", *Friday Morning*, 3 pages (Feb. 1986).
"Modified 1×2 Direction Coupler Waveguide Modulator", Electronic Letters, (Aug. 1986).

*Primary Examiner*—William L. Sikes
*Assistant Examiner*—John Ngo
*Attorney, Agent, or Firm*—Christensen, O'Connor, Johnson & Kindness

[57] ABSTRACT

An optical switch that does not require precise voltage control to produce the crossover and straight-through states. The switch comprises an electro-optic substrate in which a pattern of optical waveguides is formed, the pattern including an input waveguide that branches to form first and second output waveguides. The output waveguides pass through a coupling region within which evanescent field coupling can occur. A first pair of electrodes produces a first propagation constant difference $\Delta\beta_1$ in a first section of the coupling region, and a second pair of electrodes produces a second difference $\Delta\beta_2$ in a second section of the coupling region. By forming the first and second sections to have different lengths, and by causing $\Delta\beta_1$ and $\Delta\beta_2$ to have opposite polarities, an optical swtich is provided having wide voltage tolerances for the crossover and straight-through states.

9 Claims, 3 Drawing Sheets

OPTICAL SWITCH BASED ON 1×2 DIRECTIONAL COUPLER

FIELD OF THE INVENTION

The present invention relates to electro-optic devices, and in particular to an electro-optic switch.

BACKGROUND OF THE INVENTION

A known type of electro-optic switch is illustrated schematically in FIG. 1. The switch comprises a pair of optical waveguides 12 and 14 formed in an electro-optic substrate 16 such as lithium niobate. Waveguides 12 and 14 include respective coupling sections 18 and 20 that lie within coupling region 22 of length L. Within coupling region 22, the waveguides are close enough to one another to permit evanescent field coupling between their respective coupling sections 18 and 20. Electrodes 24 and 26 are positioned over coupling sections 18 and 20, respectively, and permit control over the operation of the switch, as described below.

Whthin coupling region 22, an optical signal passing through one waveguide will be coupled into the other waveguide. Regarding one end of waveguide 12 as an input port 32 and the opposite ends of the waveguides as output ports 34 and 36, and optical input signal I appearing at input port 32 will in general have its power divided between the waveguides, such that it produces optical output signals at both output ports. The output signals at output ports 34 and 36 are designated $I_0$ and $I-I_0$, respectively. When an optical input signal at input port 32 appears only at output port 34, the optical switch is said to be in a straight-through state. When the optical output signal appears only at output port 36, the switch is said to be in a crossover state. The straight-through and crossover states are symbolized by circles containing equal signs and crosses, respectively, as shown in FIG. 1.

Each particular coupling region between a pair of optical waveguides is characterized by its interaction length L, by a coupling length $l_c$, and by the difference or mismatch $\Delta\beta$ between the propagation constants $\beta_1$ and $\beta_2$ of the respective waveguide coupling sections. Assume that two waveguides have equal propagation constants, such that $\Delta\beta = 0$. When an optical signal enters the coupling region in a first one of the waveguides, the power of the optical signal will begin transferring from the first waveguide to the second waveguide. After traveling a distance equal to the coupling length $l_c$, all of the optical power will have transferred to the second waveguide. Thereafter, optical power will begin transferring back to the first waveguide, such that after traveling a total length of $2l_c$, all of the optical power will have returned to the first waveguide.

As a result of the above properties, complete crossover can be produced, for waveguides that are exactly phase matched ($\Delta\beta=0$), when the interaction length L is an exact odd multiple of the coupling length $l_c$. In effect, coupling length $l_c$ is the length of a particular coupling region needed to transfer all of the optical power from one waveguide to the other waveguide, when the waveguides are phased matched. When $\Delta\beta$ is not equal to zero, then the transfer of power between the waveguides is more complex, and in general it may be impossible to achieve complete crossover using only a single pair of electrodes.

The device shown in FIG. 1 can be made to operate as an optical switch by applying a voltage to electrodes 24 and 26. Assume that the interaction length L is equal to $l_c$, and that the waveguides are phase matched ($\Delta\beta=0$) in the absence of an electric field. Under such circumstances, with zero voltage applied to the electrodes, the switch will be in the crossover state, and an input signal at input port 32 will appear only at output port 36, as described above. However, if a differential voltage is applied to electrodes 24 and 26, then the resulting electric field in the coupling region will modify the index of refraction of the electro-optic substrate and of coupling sections 18 and 20, and will whereby produce a phase mismatch $\Delta\beta$ between the propagation constants of the waveguides. As a result, the input singal will no longer entirely cross over, and will instead be split between the output ports. By appropriate selection of the voltage applied to the electrodes, the switch can be put in the straight-through state, in which all of the input signal appears at output port 34.

FIG. 2 shows the output signal $I_0$ at output port 34 as a function of the normalized propagation constant difference $\Delta\beta L/\pi$ between the waveguides. The normalized propagation constant difference is directly proportional to the applied voltage. When the applied voltage and normalized propagation constant difference are equal to zero, the switch will be in the crossover state. However, when the normalized propagation constant difference is equal to $\pm\sqrt{3}$, the switch will be in the straight-through state, and all of the optical power will appear at output port 34 as signal $I_0$. Thus the appropriate voltage applied to the electrodes can cause the optical input signal to be switched to either output port.

A significant problem with the optical switch shown in FIG. 1 is that very precise control of the voltage applied to the electrodes is required in order to produce switching with acceptably low levels of crosstalk. For example, one needs to apply and maintain voltages that produce a normalized propagation constant difference of between −0.03 and +0.03 for the crossover state, and between 1.69 and 1.77 for the straight-through state, in order to keep crosstalk between the two output ports below the 30 dB level. Other types of prior directional coupler switches, including those with multiple electrode sections within the coupling region, have similarly stringent voltage requirements.

SUMMARY OF THE INVENTION

The present invention provides an optical switch in which less precision is required in the voltage applied to the electrodes to achieve the crossover and straight-through states. The switch therefore permits much greater immunity from crosstalk, in comparison to prior optical switches.

In a preferred embodiment, the optical switch of the present invention comprises an electro-optic substrate, and a pattern of optical waveguides formed in the substrate. The pattern comprises an input waveguide that branches to form first and second ouput waveguides, at least one output waveguide having a propagation constant that can be varied by the presence of an electric field. The first and second output waveguides both pass through a coupling region within which the output waveguides are positioned so as to permit evanescent field coupling therebetween. Means are also provided for selectively generating electric fields in first and second sections of the coupling region, the first and second sections having difference lengths.

In the first section, the electric field produces a first difference $\Delta\beta_1$ between the propagation constants of the first and second waveguides. Similarly, in the second section, the electric field produces a section difference $\Delta\beta_2$ between the propagation constants of the first and second waveguides, such that $\Delta\beta_1$ and $\Delta\beta_2$ have opposite polarities. As a result of this arrangement, an optical input signal introduced into the input waveguide can be switched to either output waveguide by generating the electric fields. The characteristics of the switch are such that the switch can remain in a crossover or straight-through state, with suitably low crosstalk levels, over relatively wide ranges of electric field strengths.

DETAILED DESCRIPTION OF THE PREFERRED EMBODIMENT

Figure 1:
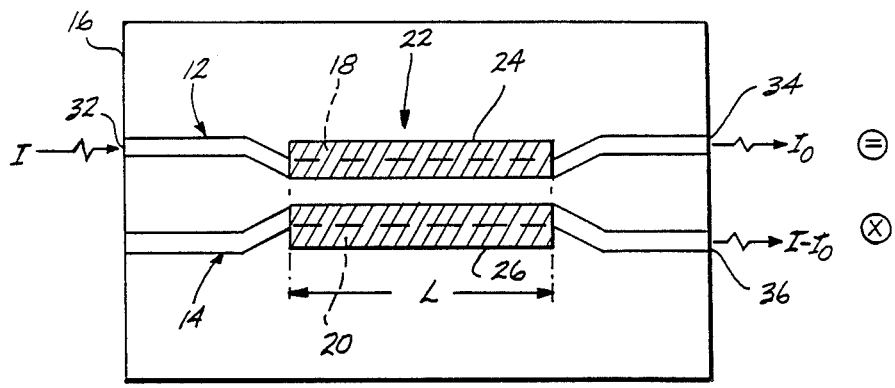
FIG. 1 is a schematic plan view of a prior art optical switch.
Figure 2:
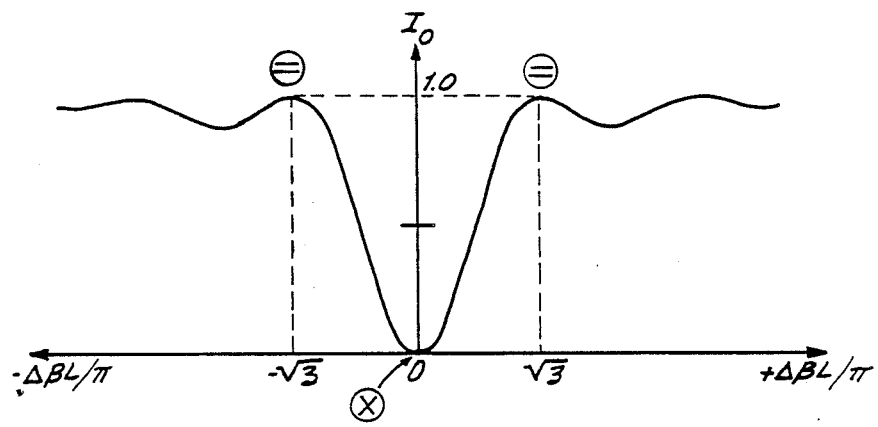
FIG. 2 is a graph illustrating the switching characteristics of the switch of FIG. 1.
Figure 3:
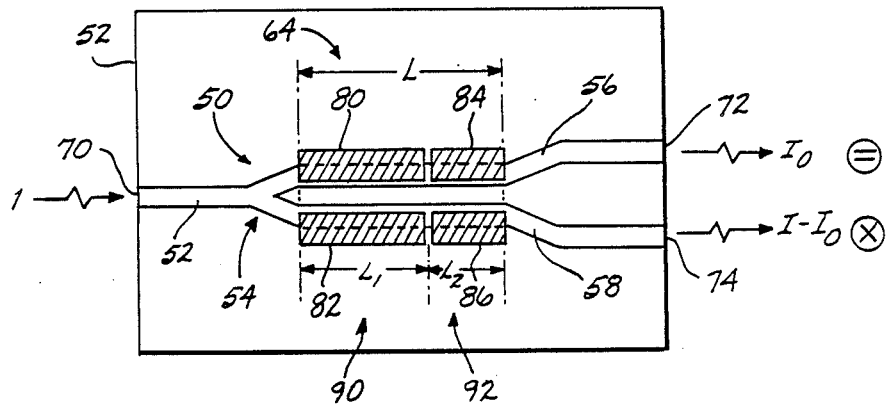
FIG. 3 is a schematic plan view of an optical switch according to the present invention.

FIG. 3 illustrates an optical switch constructed in accordance with the principles of the present invention. The switch includes a waveguide pattern 50 formed in an electro-optic substrate 52. The waveguide pattern has the form of a 1×2 directional coupler, and includes input waveguide 52 that branches at junction 54 to form a pair of output waveguides 56 and 58. Within a coupling region 64 of length L, the output waveguides are close enough to one another to permit evanescent field coupling between the output waveguides. Input waveguide 52 forms input port 70, and output waveguides 56 and 58 form output ports 72 and 74, respectively.

Figure 4:
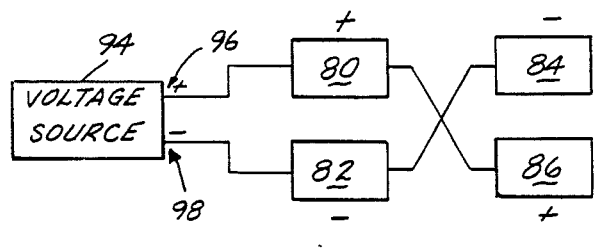
FIG. 4 is a schematic diagram showing the electrode connections of the switch of FIG. 3.

The optical switch of FIG. 3 includes a pair of first electrodes 80 and 82 and a pair of second electrodes 84 and 86. First electrodes 80 and 82 extend along output waveguides 56 and 58, respectively, within a first section 90 of length $L_1$ of coupling region 64. Second electrodes 84 and 86 extend along output waveguides 56 and 58, respectively, within a second section 92 of length $L_2$ of coupling region 64. Lengths $L_1$ and $L_2$ differ from one another. During operation of the switch, the electrode pairs are maintained at opposite polarities. For example, if electrode 80 is positive with respect to electrode 82, then electrode 86 is positive with respect to electrode 84. For convenience, it will usually be preferred to apply a voltage to electrodes 80 and 82 that is equal in magnitude, and opposite in sign, to the voltage applied to electrodes 84 and 86, so that only a single voltage source is required. Such an arrangement is illustrated in FIG. 4, wherein voltage source 94 comprises a pair of output terminals 96 and 98. Electrodes 80 and 86 are coupled to terminal 96, while electrodes 82 and 84 are coupled to terminal 98.

FIG. 4 illustrates the polarity pattern when terminal 96 is positive with respect to terminal 98. The opposite polarity could also be used.

Figure 5:
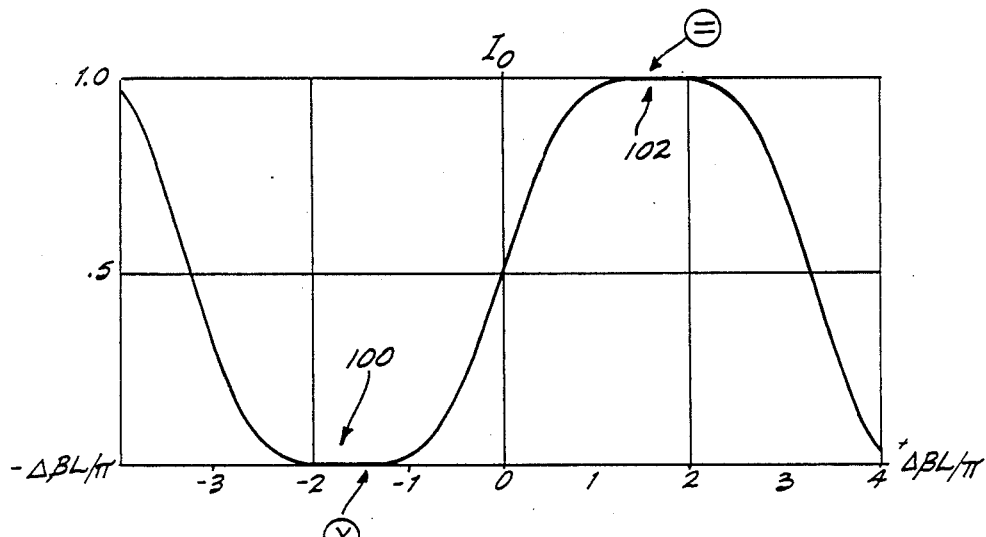
FIG. 5 is a graph illustrating the switching characteristics of the switch of FIG. 3.

FIG. 5 illustrates the operating characteristics of a preferred embodiment of the optical switch of FIG. 3. In this embodiment, equal magnitude but opposite polarity electrode voltages are used (as in FIG. 4), the total length L of coupling region 64 is equal to twice the coupling length ($2l_c$), and lengths $L_1$ and $L_2$ of the first and second coupling sections are equal to 0.68 L and 0.32 L, respectively. It is assumed that the gap between the first and second electrode pairs is small enough to be ignored. FIG. 5 shows the magnitude of the output signal $I_0$ appearing at output port 72 as a function of the normalized propagation constant difference $\Delta\beta L/\pi$. It may be seen that the graph includes a relatively long crossover region 100, and a straight-through region 102 of similar length. Within regions 100 and 102, the characteristics of the switch are relatively insensitive to the normalized propagation constant difference, and therefore to the applied voltage. In particular, a crosstalk level of less than 30 dB can be obtained within very wide ranges of ±1.35 to ±1.98 for the normalized propagation constant difference, ranges that are about an order of magnitude larger than the corresponding ranges for a conventional directional coupler optical switch. This flat response to the applied voltage within regions 100 and 102 eliminates the need for precise voltage control to achieve low crosstalk levels between the crossover and straight-through states.

Figure 6:
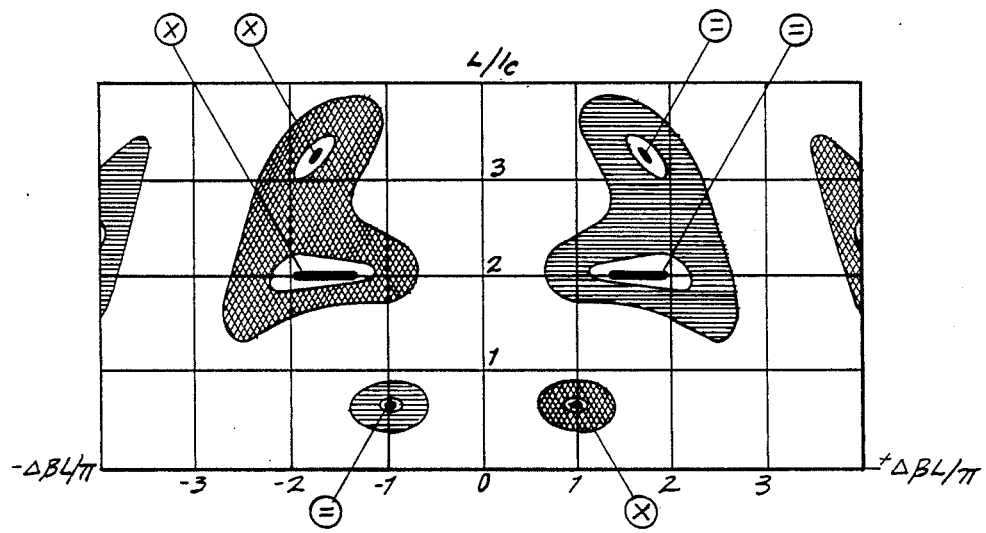
FIG. 6 is a modulation diagram of the switch of FIG. 3.

FIG. 6 presents a modulation diagram of the switch shown in FIG. 3. This diagram plots the normalized propagation constant difference $\Delta\beta L/\pi$ on the horizontal axis, and plots the normalized coupling region length $L/l_c$ on the vertical axis. This diagram assumes that equal magnitude but opposite polarity voltage are applied within sections 90 and 92, and the length of sections 90 and 92 are 0.68L and 0.32L, respectively. Solid black represents a crosstalk level of less than 30 dB, the crosshatched pattern represents region about the crossover state with crosstalk between −10 and −20 dB, and the horizontal line pattern represents regions about the straight-through state with crosstalk between −10 and −20 dB. FIG. 5 can be seen to correspond to a horizontal line in FIG. 6 at a normalized length value of 2.

The benefits of the invention may be realized by using the 1×2 directional coupler waveguide structure shown in FIG. 3, and by means of two or more unequal length sections, such as sections 90 and 92, that have alternating polarity. For example, for an optical switch using three sections within coupling region 64, these sections would all have different lengths from one another, the first and third sections would have the same polarity, and the second section would have the opposite polarity. This requirement can be phrased as one of multiple alternating polarity electrode sections of unequal length. The magnitudes of the voltage (and therefore of the nomalized $\Delta\beta$ values) need not be the same for the various sections, although the use of equal voltage magnitudes is generally preferred to simplify the implementation. For any particular number of sections selected, one can pick particular section lengths and voltages, and then derive a modulation diagram, such as the modulation diagram shown in FIG. 6. Suitable techniques for deriving such modulation diagrams are set forth in "Crosstalk Characteristics of $\Delta\beta$ Phase Reversal Directional Coupler Switches," S. Thaniyavarn, SPIE Vol. 578 Integrated Optical Circuit Engineering II (1985), and in "Switched Directional Couplers With Alternating $\Delta\beta$," H. Kogelnik et al., *IEEE Journal of Quantum Electronics*, Vol. QEE-12, No. 7, July 1976. Once the modulation diagram has been constructed, inspection of the diagram will reveal whether there are any normalized length values that include regions of low crosstalk that extend for a significant distance along the horizontal axis.

Figure 7:
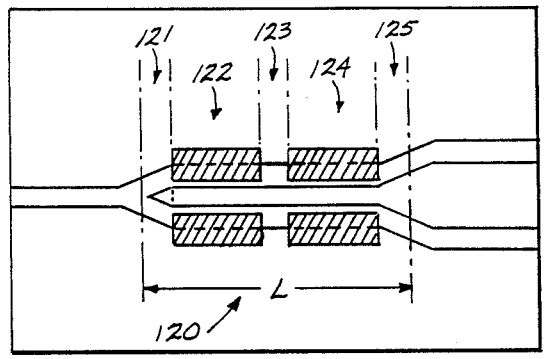
FIG. 7 is a schematic plan view of a second optical switch according to the present invention.
Figure 8:
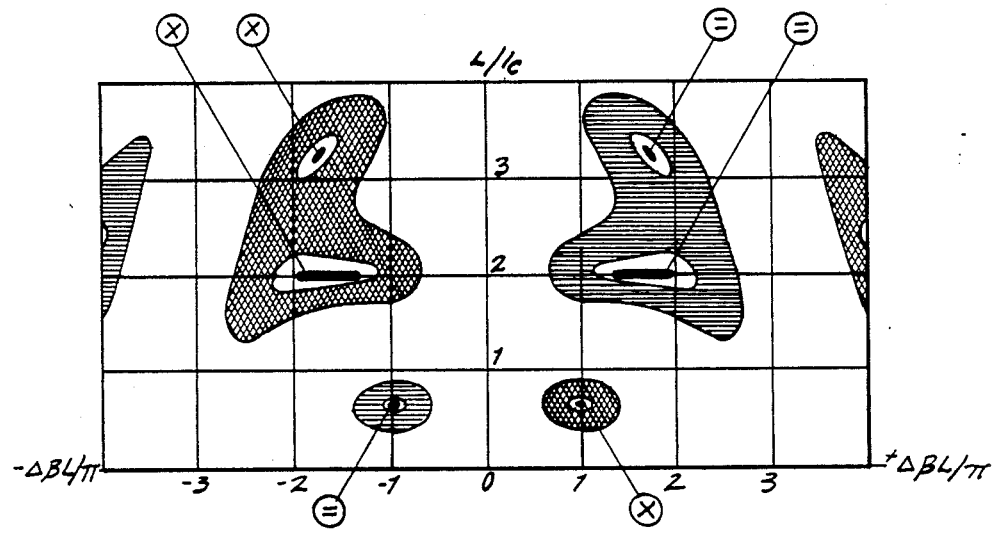
FIG. 8 is a modulation diagram of the switch of FIG. 7.

The example set forth in FIGS. 3-6 ignores the gap between the adjacent sections 90 and 92 of coupling region 64. FIG. 7 sets forth a second preferred embodiment, in which the gap lengths are taken into account. In this embodiment, coupling region 120 of total length L is viewed as being divided into five coupling sections 121-125. Coupling sections 122 and 124 include electrodes, as in the embodiment of FIG. 3, to which opposite polarity voltage are applied. Coupling section 121, 123, and 125 do not include electrodes, and the applied voltage and $\Delta\beta$ are assumed to be zero in these regions. FIG. 8 shows the modulation diagram for the switch shown in FIG. 7, on the assumption that equal magnitude but opposite polarity voltages are applied to the electrode pairs, and that coupling sections 121-125 have the following relative lengths: 0.01; 0.67; 0.005; 0.305; and 0.01. As can be seen, selection of a normalized length $L/l_c$ of about 2 again produces an effective optical switch having large crossover and straight-through regions in which low crosstalk is maintained despite relative large swings in the electrode voltage.

While the preferred embodiment of the invention have been illustrated and described, variations will be apparent to those skilled in the art. Accordingly, the invention is not limited to the specific described embodiments, but is instead to be determined by reference to the following claims.

The embodiments of the invention in which an exclusive property or privilege is claimed are defined as follows:

1. An optical switch, comprising:
   an electro-optic substrate;
   a pattern of optical waveguides formed in the substrate, the pattern comprising an input waveguide that branches to form first and second output waveguides, at least one output waveguide having a propagation constant that can be varied by an electric field;
   the first and second output waveguides both passing through a coupling region within which the output waveguides are positioned so as to produce evanescent field coupling therebetween;
   means for selectively generating an electric field in a first section of the coupling region to thereby produce in the first section a first difference $\Delta\beta_1$ between the propagation constant of the first waveguide and the propagation constant of the second waveguide:
   means for selectively generating an electric field in a second section of the coupling region to thereby produce in the second section a second difference $\Delta\beta_2$ between the propagation constant of the first waveguide and the propagation constant of the second waveguide, the first and second section having respective lengths that differ from one another, $\Delta\beta_1$ and $\Delta\beta_2$ having opposite polarities from one another; and
   whereby an optical input signal introduced into the input waveguide can be switched to a selected output waveguide by generating the first and second electric fields.

2. The optical switch of claim 1, wherein the means for generating an electric field in the first section comprises a pair of electrodes positioned adjacent to the first and second output waveguides in the first section, and wherein the means for generating an electric field in the second section comprises a second pair of electrodes positioned adjacent to the first and second output waveguides in the second section.

3. The optical switch of claim 2, further comprising means for producing a first voltage difference on the first electrode pair, and means for producing a second voltage difference on the second electrode pair, the second voltage difference being equal in magnitude but of opposite polarity from the first voltage difference.

4. The optical switch of claim 3, wherein the output waveguides in the coupling region has a coupling length $l_c$, and wherein the coupling region has a length L appraoximately equal to $2l_c$.

5. The optical switch of claim 4, wherein the length of the first section is approximately equal to 0.68L, and wherein the length of the second section is approximately equal to 0.32L.

6. The optical switch of claim 4, wherein the coupling region includes third, forth, and fifth sections that do not include electrodes, the third section being between the first and second sections, and the forth and fifth sections being on opposite sides of the first and second sections respectively with respect to the third section.

7. The optical switch of claim 6, wherein first through fifth sections have relative lengths of 0.67; 0.305; 0.005; 0.01; and 0.01, respectively.

8. The optical switch of claim 1, wherein the waveguides are formed and positioned in the coupling region such that generation of $\Delta\beta_1$ at a first polarity and $\Delta\beta_2$ at a second, opposite polarity causes the optical input signal to appear only in the first output waveguide, and production of $\Delta\beta_1$ at the second polarity and $\Delta\beta_2$ at the first polarity causes the optical input signal to appear only in the second output waveguide.

9. The optical switch of claim 8, wherein the magnitude of $\Delta\beta_1$ is equal to the magnitude of $\Delta\beta_2$.

* * * * *